3,644,316
PRODUCTION OF COATINGS AND IMPREGNA-
TIONS COMPRISING ALKYLENE GLYCOL
ACRYLIC ACETO ACETATE POLYMERS
Matthias Marx, Bad Durkheim, Heinz Pohlemann, Limburgerhof, and Hans Klug, Lampertheim, Germany, assignors to Badische Anilin- & Soda-Fabrik Aktiengesellschaft, Ludwigshafen (Rhine), Germany
No Drawing. Filed Nov. 25, 1968, Ser. No. 778,775
Claims priority, application Germany, Nov. 25, 1967,
P 16 44 990.4
Int. Cl. C08f 15/16
U.S. Cl. 260—85.5 R                     3 Claims

ABSTRACT OF THE DISCLOSURE

Air-drying coating agents and impregnants which contain (a) an ester of an olefinically unsaturated carboxylic acid with the acetoacetic monoester of an at least dihydric alcohol; (b) at least one other polymerizable ethylenically unsaturated compound and (c) a conventional polymerization initiator.

---

This invention relates to the production of coatings and impregnations by bulk polymerization of monomer mixtures based on acrylic acid esters and/or methacrylic acid esters in the air in the presence of polymerization initiators.

It is already known that solutions of poly(methyl methacrylate) in monomeric methyl methacrylate and other monomers can be used for cold-curing coating compositions (U.K. patent specification No. 1,037,904). Coatings prepared therefrom are not tack-free after drying unless paraffin has been added. Owing to the addition of paraffin, the coatings remain matt and have to be polished.

Liquid mixtures of polyunsaturated monomeric compounds, for example of ethylene glycol diacrylate or dimethacrylate, which can be polymerized without heating are also known. These mixtures do not however cure satisfactorily in the air (U.K. patent specification No. 824,677). The production of coatings from syrupy prepolymers of esters of acrylic and methacrylic acid with a specific content of allyl acrylate or allyl methacrylate are also known. In this way tack-free films are obtained when air is allowed access but the course of the cure in this method is only satisfactory when the starting mixture has a high viscosity so that the Trommsdorff effect has an accelerating action. However, these mixtures often cannot be applied by conventional techniques owing to their high viscosity.

The object of the invention is to provide coating agents and impregnants which do not have the above disadvantages, which can be processed using conventional methods and which dry with access of air to give non-tacky solvent-resistant coatings and impregnations.

These objects are achieved by coating agents and impregnants which contain:

(a) 0.01 to 49% by weight of a copolymerizable ester of an olefinically unsaturated carboxylic acid having three to five carbon atoms which contains as the alcohol component an acetoacetic monoester of an at least dihydric alcohol having two to ten carbon atoms;

(b) 51 to 99.99% by weight of at least one polymerizable olefinically unsaturated compound which is not identical with component or monomer-polymer syrup thereof (a), which has a boiling point above 70° C. at atmospheric pressure and which is present to the extent of from 40 to 100% in monomeric form; and (c) A conventional polymerization initiator. The components (a) are esters of olefinically unsaturated carboxylic acids having from three to five carbon atoms which contain as the alcohol component the acetoacetic monoester of a dihydric (or higher polyhydric) alcohol having from two to ten carbon atoms. The appropriate esters of acrylic and/or methacrylic acid are especially suitable and of these particularly the esters which contain as the dihydric alcohol component one having from two to four carbon atoms or the 3-oxapentylene-1,5 radical derived from diethylene glycol. Example of very suitable compounds are ethylene glycol acrylate acetylacetate, ethylene glycol methacrylate acetylacetate, 1,2-propylene glycol acrylate acetylacetate, 1,2-propylene glycol methacrylate acetylacetate, 1,3-propylene glycol acrylate acetylacetate, 1,3-propylene glycol methacrylate acetylacetate, 1,4-butanediol acrylate acetylacetate, 1,4-butanediol methacrylate acetylacetate, diethylene glycol acrylate acetylacetate or diethylene glycol methacrylate acetylacetate. Esters or hemiesters of maleic acid, fumaric acid, methylenemalonic acid and/or itaconic acid which contain at least once the acetoacetic acid hemiester of the abovementioned alcohols as the alcohol component, for example ethylene glycol acetylacetate n-butyl maleate and 1,4-butanediol acetylacetate maleic hemiester having one free carboxyl group, are also suitable. The esters of olefinically unsaturated carboxylic acids which contain as the alcohol component an acetoacetic monoester of a more than dihydric alcohol, as for example glycerol or pentaerythritol, as for example glycerol acrylate acetylacetate or glycerolmethacrylate acetylacetate are also suitable. The amount of olefinically unsaturated acetoacetic esters used is from 0.01 to 49%, preferably 5 to 49% and particularly 15 to 30%, by weight of the mixture of components (a) and (b).

Polymerizable olefinically unsaturated compounds which are present to the extent of from 40 to 100% by weight in monomeric form are suitable as component (b). Esters of acrylic acid or methacrylic acid with alcohols, particularly alkanols, having from one to eighteen and particularly from one to eight carbon atoms, are particularly suitable as component (b). Examples are the appropriate methyl, ethyl, propyl, n-butyl, isobutyl, tert-butyl and 2-ethylhexyl esters, of the esters of higher alcohols, the decyl or dodecyl esters, and mixtures of these esters.

Other suitable components (b) are copolymerizable olefinically unsaturated compounds which are preferably used in combination with the acrylic or methacrylic esters in order to modify the coating agent in a conventional manner according to the desired application thereof. Examples are vinyl esters of monocarboxylic acids having from two to fifteen carbon atoms, such as vinyl acetate, vinyl propionate, vinyl pivalate or vinyl esters of branched monocarboxylic acids having five to fifteen carbon atoms which have been prepared by reaction of olefins with carbon monoxide and water or acids, vinylaromatics such as styrene or vinyltoluenes, copolymerizable olefinically unsaturated carboxylic acids having from three to five carbon atoms such as acrylic acid, methacrylic acid, maleic acid, fumaric acid or itaconic acid (particularly in amounts of from 0.5 to 15% by weight), amides of these acids such as acrylamide, methacrylamide, N-n-butoxymethylmethacrylamide or N-methylolacrylamide (particularly in amounts of from 1 to 20% by weight), allyl esters and crosslinking monomers having more than one olefinically unsaturated double bond such as diallyl phthalate, allyl acrylate or allyl methacrylate, ethylene glycol diacrylate, ethylene glycol dimethacrylate or divinylbenzene (particularly in amounts of from 0.2 to 15% by weight) and, to achieve special effects, nitriles of the acids, especially acrylonitrile and methacrylonitrile.

Other copolymerizable olefinically unsaturated esters and/or amides of acetoacetic acid such as the allyl esters, allylamide or amides of the type of N-acrylo-N'-acetoacetylhexamethylenediamine or N-methacrylo-N'-acetoacetylhexamethylenediamine may also be used.

The polymerizable ethylenically unsaturated compounds of component (b) are not identical with component (a) and at atmospheric pressure they have a boiling point which is higher than 70° C. The component (b) is contained in an amount of from 51 to 99.99%, preferably from 51 to 95% and particularly from 70 to 85%, by weight in the total mixture of components (a) and (b).

An expert will known the suitable monomer mixtures to choose for the special purposes for which the coating materials are to be used. Examples of very suitable compositions are monomer mixtures of 50 to 85% by weight of methyl methacrylate, 0 to 25% by weight of an acrylic or methacrylic ester of a primary or secondary alkanol having four to eight carbon atoms and 0 to 10% by weight of acrylic acid and/or methacrylic acid and/or N-butoxymethacrylamide and/or N-butoxymethylmethacrylamide and 10 to 40% by weight of the special acetylacetates to be used according to this invention or mixtures of 10 to 50% by weight of a flowable polymer or copolymer based on a methyl, ethyl, propyl or tert-butyl ester of acrylic or methacrylic acid, if desired mixed with styrene, acrylonitrile or vinyl esters of branched monocarboxylic acids, 10 to 50% by weight of an appropriate ester or mixture of esters in monomeric form and 10 to 40% by weight of a monomeric acrylic or methacrylic ester containing acetylacetate groups to be used according to this invention.

The mixtures of the above-mentioned type may also be used in partly polymerized form, particularly for use as binders in the production of coatings. A particularly advantageous method for the production of binders consists in preparing a flowable prepolymer by free radical polymerization of a suitable mixture of monomers with or without the use of the polymerizable acetoacetic ester and adding further olefinically unsaturated monomers together with unsaturated acetoacetic esters according to this invention to modify the prepolymer prior to its use as a binder and then diluting it to the viscosity required for its application. Polymerization inhibitors may be added after the prepolymerization has been stopped in order to increase the stability of such syrups in storage. It is also possible to dissolve an independently prepared polymer in monomers with the use of the unsaturated acetoacetic esters and to complete the polymerization of the mixture at a later time.

Conventional additives may be added to the coating materials or impregnants in minor amounts. Examples of these additives are other polymers such as poly(methyl methacrylate), polymers having reactive groups, unsaturated or saturated polyester resins, aminoplasts, epoxide resins, cellulose derivatives, air-drying synthetic or natural oils, and also plasticizers, soluble dyes, pigments, flow improvers, gloss improvers, solvents in small amounts and ultraviolet stabilizers.

The coating materials and impregnants generally have added to them a polymerization initiator with or without an accelerator and are polymerized in bulk on or in the substrate. The cured coatings are non-tacky even when dried with access of air and are insoluble in the usual solvents and as a rule only slightly swellable. It is not necessary to use a crosslinking diolefinic monomer of the said type to achieve insolubility if the proporation of copolymerisable acetoacetic ester used according to the invention in the coating material or impregnant is not too small. The minimum proportion can easily be determined for a given coating material by a few preliminary experiments.

Particularly suitable polymerization initiators or catalysts for the polymerization or cure of the applied coating material are catalyst systems of a peroxidic compound and a tertiary amine and particularly aromatic peroxides such as benzoyl peroxide, p-chlorobenzoyl peroxide or m-dichlorobenzoyl peroxide and aromatic tertiary amines such as dimethylaniline or dimethyl-p-toluidine. They are added to the coating materials advantageously in an amount of from 0.005 to 5% and particularly from 0.1 to 3%, by weight of the whole of the monomers. Other conventional polymerization initiating systems such as hydroperoxides and metal compounds, or peroxides or azo compounds alone which are particularly suitable for curing the coatings and impregnations at elevated temperature are also suitable. Suitable polymerization initiators are also photosensitizers such as benzoin or benzoin methyl ether which initiate the polymerization upon exposure to light. Cure of the coating materials and impregnants may also be effected by the use of high energy radiation as the polymerization initiator, for example by accelerated electrons or by gamma-radiation, for example from a cobalt or cesium source.

In almost all cases an addition of a small amount of a heavy metal compound as an autoxidation catalyst, particularly of cobalt, lead, iron and/or manganese, has an advantageous effect on the cure of the coating material and particularly on the mechanical properties such as surface hardness of the films obtained or solvent resistance of impregnations. Salts of the said metals, for example cobalt octoate, cobalt acetate, cobalt acetate bromide, lead naphthenate, iron naphthenate, cobalt naphthenate, lead octoate, cobalt octoate, manganese naphthenate, manganese octoate, and also complex compounds such as the iron or cobalt salts of 1,4-butanediol acrylate acetylacetate, are advantageous. These autoxidation catalysts are advantageously used in an amount of from 0.01 to 5% by weight on the amount of monomers.

The new coating materials may be used for the production of coatings for a great variety of purposes; they are generally applied to the substrate such as metal, wood, glass, porcelain or plastics, in the absence of any substantial amount of solvent, and cured on the substrate in bulk in the presence of the polymerization initiator. It is an advantage of the coating materials and impregnants that they cure fairly quickly even at room temperature (given a suitable catalyst system) so that evaporation of the monomers is not very marked. Another advantage is that they can be applied without solvents and that they form coatings and impregnations which are insoluble and do not swell in most of the usual solvents.

The invention is illustrated by the following examples. The parts and percentages given in the examples and comparative experiments are by weight.

EXAMPLE 1

0.1 part of dimethylaniline, 0.1 part of a 10% solution of cobalt octoate in styrene and 0.4 part of m-dichlorobenzoyl peroxide are stirred into a mixture of 8 parts of monomeric methyl methacrylate, 1 part of monomeric 2-ethylhexyl acrylate and 1 part of 1,4-butanediol acrylate acetylacetate. This mixture is applied to tin-plated steel sheets in a thickness of 100 microns and allowed to stand at about 25° C. in diffused light. A clear tack-free film is formed in thirty-five minutes. After about one to two hours the film is hard and insoluble in butyl acetate, acetone, dimethylformamide and xylene.

COMPARATIVE EXPERIMENT TO EXAMPLE 1

For comparison, a mixture of 8 parts of monomeric methyl methacrylate, 1 part of 2-ethylhexyl acrylate and 1 part of allyl acrylate is processed in the way described in Example 1. The coating is still liquid after thirty-five minutes. After one day the major portion of the coating has evaporated without having formed a film.

EXAMPLE 2

80 parts of methyl methacrylate, 0.8 part of tert-dodecylmercaptan and 1 part of azoisobutyronitrile are stirred for eight hours in a nitrogen atmosphere at 60° C. A viscous composition which is just able to flow is formed after this time. This is cooled to 20° C. by external cooling and pouring in a cold solution of 0.05 part of hydroquinone and 20 parts of 2-ethylhexyl acrylate.

5 parts of this prepolymer, 2 parts of methyl methacrylate, 3 parts of 1,4-butanediol acrylate acetylacetate, 0.4 part of m-dichlorobenzoyl peroxide, 0.1 part of dimethylaniline and 0.1 part of a 10% solution of cobalt octoate in styrene are mixed homogeneously. This mixture is applied in a thickness of about 100 microns to sheet aluminum. A clear tack-free film is obtained after twenty minutes. After fifteen hours the film is odorless, hard and insoluble in butyl acetate and in the usual solvents for coating materials. The loss in weight of the film by evaporation is 8% of the original weight.

COMPARATIVE EXPERIMENT (A) TO EXAMPLE 2

5 parts of the prepolymer from Example 2, 2 parts of methyl methacrylate, 3 parts of allyl acrylate, 0.4 part of m-dichlorobenzoyl peroxide, 0.1 part of dimethylaniline and 0.1 part of a 10% solution of cobalt octoate in styrene are mixed homogeneously. 5 parts of the mixture is treated as described in Example 2.

Tacky films are formed after twenty minutes. Although the films are hard and tack-free after fifteen hours, they have an unpleasant odor of allyl acrylate and are soluble in butyl acetate. The loss in weight of the films by evaporation is 79% of the original weight.

COMPARATIVE EXPERIMENT (B) TO EXAMPLE 2

5 parts of the prepolymer from Example 2, 5 parts of methyl methacrylate, 0.4 part of m-dichlorobenzoyl peroxide, 0.1 part of dimethylaniline and 0.1 part of a 10% solution of cobalt octoate in styrene are mixed homogeneously. The mixture is applied to sheet aluminum in a thickness of about 100 microns. Soft film is formed after twenty minutes. After twenty hours the film is fairly hard but it is brittle and soluble in butyl acetate. The weight loss of the film by evaporation is 64% of the original weight.

EXAMPLE 3

A mixture of 7 parts of ethyl acrylate, 2.5 parts of vinyl pivalate and 0.5 part of ethylene glycol acrylate acetylacetate (with which 0.1 part of dimethyl-p-toluidine 0.1 part of a 10% solution of cobalt octoate in styrene and 0.4 part of m-dichlorobenzoyl peroxide has been mixed) is poured onto a sheet of glass in a layer having a thickness of about 150 microns. After about twenty-five minutes at 30° C., a film is formed which is free from tackiness; after complete curing it has very good resistance to solvents for coating materials as specified in Example 1.

EXAMPLE 4

50 parts of methyl methacrylate and 30 parts of a vinyl ester of a mixture of branched monocarboxylic acids having nine to eleven carbon atoms are stirred with 0.6 part of dodecylmercaptan and 1 part of azoisobutyronitrile in a nitrogen atmosphere at 70° C. for four hours. The viscous composition which is still flowable and which contains about 30% by weight of polymer is cooled to about 50° C. After a solution of 0.05 part of hydroquinonie in 20 parts of tert-butyl acrylate has been added, the whole is cooled to 20° C. 6 parts of this prepolymer is mixed homogeneously with 3 parts of methyl methacrylate, 1 part of 1,4-butanediol methacrylate acetylacetate and 0.2 part of benzoin methyl ether. A nylon nonwoven is impregnated with this mixture, the excess is pressed out, and the impregnated material is suspended and exposed for about ten minutes to a source of ultraviolet light.

The resistance to solvents of the material thus obtained is evident from the fact that no delamination is observed upon shaking in trichloroethylene.

EXAMPLE 5

A prepolymer, which has been prepared under the reaction conditions specified in Example 4 from 30 parts of styrene, 20 parts of acrylonitrile and 20 parts of isobutyl acrylate, is cooled and diluted with 30 parts of methyl acrylate. 7 parts of this prepolymer is mixed with 0.2 part of acrylic acid, 1.8 parts of 1,2-propylene glycol acrylate acetylacetate, 1 part of allyl acrylate and the initiator/activator system specified in Example 3 are mixed and spread onto a smooth wooden surface.

A firmly adherent, hard coating having good resistance to solvents is obtained after a short time.

When the acrylic acid is replaced by N-butoxymethyl methacrylamide and the temperature is raised for a short time to about 125° C., an additional cure is achieved.

We claim:
1. Production of coatings and impregnations by applying to the substrate an air-drying mixture consisting essentially of
   (a) 5 to 49% by weight of an ester of acrylic or methacrylic acid which contains as the alcohol component an acetoacetic monoester of a dihydric alcohol having from two to ten carbon atoms;
   (b) 51 to 95% by weight of at least one polymerizable olefinically unsaturated compound which is not identical with said component (a) or monomer-polymer syrup thereof and selected from the group consisting of esters of acrylic acid or methacrylic acid with alcohols having one to eighteen carbon atoms, vinyl esters of monocarboxylic acids having two to fifteen carbon atoms, styrene, acrylonitrile and methacrylonitrile, said component (b) being present to the extent of 40 to 100% in monomeric form; and
   (c) 0.005 to 5% by weight, with reference to the total weight of the monomers, of a polymerization initiator.
2. An air-drying mixture as in claim 1.
3. An air-drying coating material or impregnant as in claim 1 containing as component (a) a compound selected from the group consisting of 1,4-butanediol acrylate acetylacetate, 1,4-butanediol methacrylate acetylacetate, ethylene glycol acrylate acetylacetate, ethylene glycol methacrylate acetylacetate, 1,2-propylene glycol acrylate acetylacetate, diethylene glycol acrylate acetylacetate, diethylene glycol methacrylate acetylacetate and 1,2-propylene glycol methacrylate acetylacetate.

References Cited

UNITED STATES PATENTS

| 2,516,064 | 7/1950 | Marks | 260—86.1 E |
| 2,920,102 | 1/1960 | Bockstahler et al. | 260—86.1 |
| 3,266,930 | 8/1966 | Emmons et al. | 260—86.1 |

FOREIGN PATENTS

| 717,652 | 1/1942 | Germany. |

OTHER REFERENCES

Die Makromolekulare Chemie, vol. 93, p. 127 (1966).

HARRY WONG, JR., Primary Examiner

U.S. Cl. X.R.

117—124, 128.4, 138.8, 140, 148, 161 H, 161 N, 161 UC; 204—159.22; 260—28.5, 31.2, 78.4, 78.5, 86.1, 86.7, 89.5, 836, 851, 885, 901

PO-1050
(5/69)

UNITED STATES PATENT OFFICE
CERTIFICATE OF CORRECTION

Patent No. 3,644,316          Dated February 22, 1972

Inventor(s) Matthias Marx, Heinz Pöhlemann, and Hans Klug

It is certified that error appears in the above-identified patent and that said Letters Patent are hereby corrected as shown below:

Column 1, line 5, "Durkheim" should read -- Duerkheim --.

Column 3, line 21, "butoxymethacrylamide" should read -- butoxymethylacrylamide --.

Column 5, line 64, "hydroquinonie" should read -- hydroquinone --.

Signed and sealed this 19th day of September 1972.

(SEAL)
Attest:

EDWARD M. FLETCHER, JR.          ROBERT GOTTSCHALK
Attesting Officer          Commissioner of Patents